Dec. 16, 1947.  P. V. PALMQUIST  2,432,928
TRANSPARENT PRESSURE-SENSITIVE LENTICULAR SHEET
Filed May 4, 1943
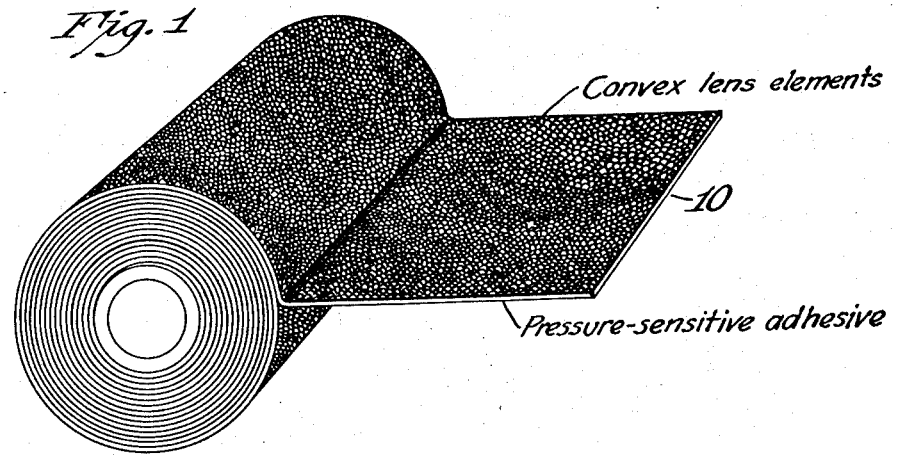
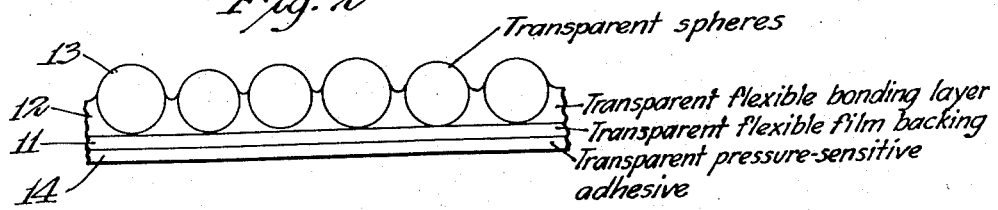
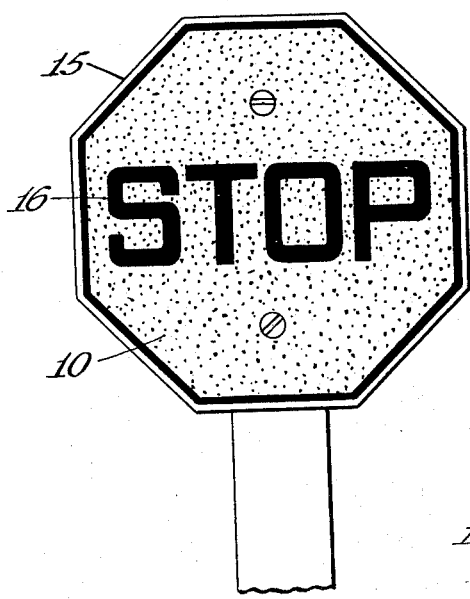
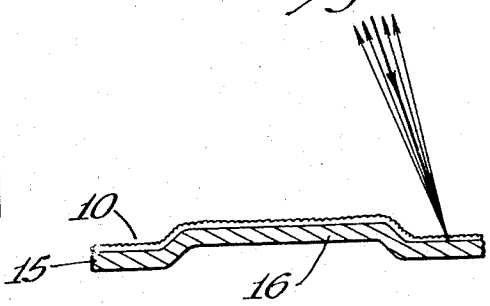
Inventor
Philip V. Palmquist
By Carpenter, Abbott, Coulter & Kinney
Attorneys Patented Dec. 16, 1947

2,432,928

UNITED STATES PATENT OFFICE 2,432,928

TRANSPARENT PRESSURE-SENSITIVE LENTICULAR SHEET

Philip V. Palmquist, New Canada Township, Ramsey County, Minn., assignor to Minnesota Mining & Manufacturing Company, St. Paul, Minn., a corporation of Delaware Application May 4, 1943, Serial No. 485,610

6 Claims. (Cl. 40—135)

This invention relates to flexible, transparent, pressure-sensitive (normally tacky) optical adhesive tape or sheeting which includes a lenticular layer of contiguous small convex lens elements adapted to produce reflex reflection of incident light from reflective surfaces to which the tape or sheeting is adhered.

This lenticular sheet material is adapted to be wound directly in rolls without employment of a liner and supplied in this convenient form to users. The user may readily apply it whenever desired, by unwinding the desired amount from a roll and applying it to the reflective surface (such as the surface of a highway marker or sign), the tacky pressure-sensitive adhesive making for an immediate firm self-sealing bond. The transparent lenticular sheet will then modify the reflection of an incident ray or beam of light striking the reflective surface so as to largely return the light in the direction of its source, even though the light strikes at an angle. By this means the brilliancy of the reflected light, as seen by an observer located near the axis of incident light, is greatly increased, since the dissipation of the reflected light in other directions is greatly reduced. It is thus possible to very substantially improve the night time visibility of highway markers and signs as viewed by the occupants of approaching vehicles. The transparency of the covering sheet is such that it does not interfere with visibility under day light viewing conditions (when an observer views the sign by diffused sunlight).

This application is a continuation-in-part of my copending application Ser. No. 351,168, filed August 3, 1940, which has matured into Patent No. 2,354,048.

A further object is to provide pressure-sensitive lenticular sheet material of the character described which is weather proof so that it may be applied to outdoor signs and will remain effective for at least a year of continuous exposure to sunlight, rain, snow and extreme temperature variations, etc., without coming off, disintegrating, or losing transparency. For some purposes, however, such weatherproofness is not necessary; a lesser degree of weather-resistance sufficing where outdoor use is only of short duration, as in the case of temporary signs. Resistance to weathering is not of course a factor when the sheet material is not employed outdoors.

Another object is to provide the sheet material with a transparent pressure-sensitive adhesive which is solar-hardening so that, after being applied to the surface of an outdoor sign or the like, exposure to the solar rays will result in the adhesive hardening up to make for a permanent bond preventing removal of the sheet, yet without the adhesive darkening or losing transparency.

Another object is to provide sheet material of the character described which is stretchy and may readily be conformed to curved or irregular surfaces, such as when applied over embossed areas of signs. In the form of stretchy tape, the product may be positioned so as to conform to curved or irregular lines or outlines on the surface, as for example it may be applied to form the letter S without buckling or gathering.

Various other objects and features will be evident from the following description.

In the accompanying illustrative drawings:

Fig. 1 shows a roll of the transparent pressure-sensitive optical tape or sheet wound upon itself;

Fig. 2 is a diagram indicating, in magnified form, a section of an illustrative tape or sheet;

Fig. 3 is a plan view of a highway "stop sign" having embossed (raised) lettering, over the surface of which has been applied a transparent optical sheet of the character described, for the purpose of producing "reflex" reflection of incident light beams; and Fig. 4 is a sectional view taken through one of the raised letters in Fig 3, which illustrates the nature of the "reflex" reflection obtained when the transparent optical sheet has been applied to the sign surface.

Referring to Fig. 1, the transparent and flexible lenticular tape or sheet 10 is broadly illustrated as having a pressure-sensitive (normally tacky) adhesive side which adapts it to adhere to surfaces with which it is placed in contact by its own self-sealing action, the sheet sticking instantly without need of activation by water, solvents or heat. The opposite side or face comprises a multiplicity of contiguous small convex lens elements, producing a lenticular type of surface for refracting light. This tape or sheet is shown wound in roll form, without a liner, so that the adhesive surface contacts the lenticular back surface of the underlying turn. The limited area of contact facilitates unwinding of the roll when it is desired to remove the tape or sheet for use, while the adhesive sticking together of adjacent turns of the roll holds the roll together in positive fashion to prevent unwinding except when desired. The roll can be used in various types of pressure-sensitive adhesive tape dispensers for convenience in application (see, for example, the dispensers described in U. S. Patents Nos. 1,972,850, 1,972,851, 2,221,213 and 2,233,361).

Fig. 2 shows in diagram fashion an illustrative structure for the aforesaid lenticular adhesive tape or sheet material. A transparent flexible film backing 11 is provided on one face with a transparent flexible bonding layer 12 in which a layer of transparent spheres 13 are partially embedded with their inner extremities substantially in contact with the film backing and with their outer extremities exposed to provide a lenticular surface comprised of a multiplicity of convex lens elements. A transparent pressure-sensitive adhesive coating 14 is provided on the other side of the film backing.

The spheres may be small transparent glass beads, having an average diameter in the range of 3 to 10 mils for example, which makes for good flexibility and transparency of the sheet and a relatively "smooth" surface, although dimensions outside this range can be employed. The transparent film backing and adhesive coating provide a predetermined spacing of the spheres from any surface to which the sheet is applied. For optimum brilliancy of reflex reflection, using beads of ordinary glass (refractive index about 1.50–1.55), the spacing distance should be equal to 20–50% of the average bead diameter. The optimum spacing approaches zero as the refractive index increases toward 1.85–1.90, and increases as the refractive index decreases. This assumes that the refractive indices of the materials are all approximately the same as that of the spheres. The optimum spacing will be less or greater if the transparent media behind the spheres has an index less or greater, respectively, than that of the spheres. For a more detailed discussion of the effect of spacing on reflex optical properties, reference may be made to my U. S. Patent No. 2,294,930, issued September 8, 1942.

For outdoor sign use, the components should be weatherproof and should not darken on prolonged exposure to solar rays. The layers should be waterproof and integrally united so that splitting or delamination will not occur. The transparent bonding layer 12 is exposed and should be selected with reference to ability to withstand weathering conditions so as to hold the spheres in place. This layer is of such thickness that it effectively holds the spheres in sockets, but undue shrinking or disintegration would result in the spheres becoming loosened. Further, this layer should not darken and should be non-tacky (so as to avoid picking up and holding dirt from the air). The film backing 11, and adhesive coating 14, are protected by the overlying spheres and bonding layer and the requirements are not so strict, but they should be substantially non-darkening and should resist exposure to water at the edges which may occur in use. The pressure-sensitive adhesive coating should not soften up on exposure to solar rays. A feature of the invention is that a solar-hardening adhesive is provided, so that a permanent bond to the underlying surface will develop after application to an outdoor sign, so as to minimize the chance of pilfering of the sheet material.

The requirements are not so strict when the sheet material is to be employed outdoors for temporary use only, and still less when the sheet material is employed for indoor use.

It is desirable for sign-making purposes to provide a stretchy tape or sheet, so that it can readily be conformed to the surface of an embossed sign or other base having an uneven or irregular surface. Even in the case of an ostensibly flat surface, the use of stretchy tape or sheeting is desirable in order to insure continuous and intimate contacting, since such surface will not be an optical plane, and uniform and optimum spacing of the spheres from the base surface is facilitated by using a sheet which uniformly hugs the surface. A stretch of at least about 25% is desirable. A "dead-stretch" characteristic is desirable, rather than a strong elastic stretch, so that when the sheet is conformed to an embossed surface (for example), the regain forces will be insufficient to pull the sheet away from the surface. The invention is not limited to a stretchy product.

Fig. 3 shows a highway "stop sign" illustrating a use of the transparent optical adhesive sheeting. This sign is a regular embossed and enameled metal sheet 15, the lettering 16 being raised above the background by embossing. In a typical sign of this kind, the raised lettering is enameled black and the background is enameled yellow. A transparent lenticular pressure-sensitive adhesive sheet 10, of the character described, and which for this purpose should be of the stretchy type, is applied over the entire face of the sign to cover it and is rolled and pressed down so as to conform to the surface irregularities and embossing, the tacky under face of the sheet causing self-sealing bonding and holding the sheet in intimate contact.

Fig. 4 shows the transparent sheet 10 in contact with the surface of sign 15 and conforming to the raised lettering 16.

The superimposed transparent sheet will not appreciably interfere with the normal appearance and visibility of the sign when viewed by diffused light, as during day time. In fact, at a short distance away, the presence of the sheet will not be noticed.

When viewed at night by the occupants of approaching vehicles, the head lamps of which illuminate the sign, the sign will be visible and readable at far greater distances than would be true if the superimposed transparent optical sheet had not been used. The reason is that the lenticular sheet collimates the light, by refraction before and after reflection from the underlying surface of the sign, and selectively returns it toward its source in a brilliant cone. This reflex reflecting action is illustrated diagrammatically by the rays shown in Fig. 4, the incident ray or beam of light (which is shown impinging on the reflective background area) being returned toward the source in a coaxial brilliant cone of light even though the incident light strikes at an angle to the reflector surface. Thus in this sign, the yellow reflective background for the letters will stand out with a brightness many times greater than would be the case if the lenticular sheet were not present. The black lettering will of course continue to appear black since it does not reflect light.

The present invention thus provides a way by which existing signs can be readily and inexpensively converted to signs of the reflex type. In converting old metal traffic signs, the best result will be obtained by refinishing to provide a fresh and clean reflective surface. The old sign can be dipped in caustic solution to remove the paint or enamel and is then refinished in the usual way by enamelling to provide background and lettering. A roll of the transparent lenticular adhesive sheeting (of adequate width) is mounted on a roller support so that the sheeting can be unwound, tacky side up, upon a table top. The requisite amount having been drawn off and lying on the table, the sign is placed over it with the painted surface down and contacting the tacky adhesive surface of the sheeting. The latter is then trimmed away at the edges, usually with an extended margin being left around the sign. The sign is then turned over and is passed between wringer rolls of soft rubber, the roll in contact with the sheeting pressing it down and conforming it to the sign surface. The marginal extremities can be folded back around the sign edges. If any air pockets are formed under the sheeting, or any buckles result, they can be removed by locally pricking or slitting the sheeting and then pressing down to provide smooth contact.

Temporary signs are often used which are made of a waterproofed cardboard printed on one face. It is a simple matter to cover the printed surface with the transparent lenticular adhesive sheet so as to provide a sign of the reflex reflecting type. Furthermore, this covering sheet will protect the sign face and will provide an attractive appearance when viewed by day light.

As a further illustration of use, the transparent lenticular adhesive sheeting may be applied over advertising display surfaces in store windows, as for example over the advertising jackets on books in a bookstore window. By day, the advertising matter will be plainly visible because of the transparency of the covering sheet. Lights may be provided near the front of the window, directed back toward the advertising display, for night illumination which will make for reflex reflection visible to persons walking by the window, the effect of which is to make the display stand out in brilliant fashion adapted to attract attention.

The adhesive tape or sheet material of this invention is not limited to use for producing reflex reflection. Adhesive tape may be supplied in convenient roll form for other uses such as, for example, the sealing of gift packages. Transparent sealing tape of this kind has a "de luxe" appearance when the exposed surface is formed of a layer of small glass beads.

The components of the adhesive tape or sheet do not need to be of an uncolored nature. Thus the spheres, bonding layer, backing film or adhesive layer, or all of them, may be tinted without rendering the sheet non-transparent.

A fluorescent or luminescent material may be incorporated in the sheet material in amount which does not opacify the sheet, to provide a glow effect visible in darkness or semi-darkness and which may be employed to provide illumination for an underlying surface to which the sheet is applied. Thus the fluorescent or luminescent material may be included in the transparent film backing 11 of the Fig. 2 construction.

The illustrative construction shown in Fig. 2 and described in connection therewith, is formed by uniting a plurality of elements (11, 12 and 13) to make the sheet on which the pressure-sensitive adhesive is coated. A flexible transparent sheet having the same optical properties may be made by embossing a film, or casting a film, using a female embossing or casting die having a multiplicity of contiguous concave depressions adapted to produce contiguous convex lens elements in the surface of the film. A thermoplastic film, such as a film of cellulose acetate or ethyl cellulose, may be formed in this way to provide a lenticular surface, by hot pressing with a suitable die or embossing surface. The pressure-sensitive adhesive may then be coated on other side. The remarks previously made as to the effect of spacing on reflex optical properties of course apply. A distance rearward of the outer exposed convex lens extremities, equal to twice the radius of curvature of the lens surfaces, corresponds to the diameter of the equivalent sphere shown in the Fig. 2 construction. The total thickness of the finished adhesive sheet should be made such as to produce the desired optical properties, and hence will ordinarily exceed twice the radius of curvature, the thickness for optimum brilliancy depending on the index of refraction as previously mentioned.

EXAMPLE

There will now be described an illustrative technique for manufacturing transparent lenticular adhesive sheeting of the type shown in Fig. 2, which may be produced in continuous fashion and wound in rolls of any reasonable length and width as desired. The sheeting of this example is highly weatherproof and non-darkening when exposed to the sun outdoors, has a solar-hardening adhesive, and is highly stretchy.

A reusable carrier web was first prepared for casting the film backing 11 of Fig. 2. A roll of strong paper having a smooth surface (such, for example, as 40 lb. per ream Acme Fourdrinier paper), was passed through a knife-coater and coated on one side with the following solution in an amount sufficient to provide a dried coating having a weight of about 10 grains per 24 sq. in., followed by drying to set up the coating.

|  | Parts by weight |
|---|---|
| Vinyl acetate polymer (such as the AYAA type sold by Carbide & Carbon Chemicals Corp.) | 35 |
| Denatured ethyl alcohol | 65 |
| Ground mica | 17.5 |

The resultant surface of this carrier web was quite smooth and adapted as a base for casting the film backing, the latter being subsequently stripped off.

The following solution was used for forming the film backing:

| | |
|---|---|
| Polyvinyl butyral (such as the XYSG type sold by Carbide & Carbon Chemicals Corp.) | 34.5 |
| Tricresyl phosphate | 10.5 |
| Denatured ethyl alcohol | 105 |

The above solution was applied by knife-coating, in amount approximating a wet weight of 20–22 grains per 24 sq. in., such as will provide a dried film having a thickness of approximately 1.2 mils, followed by drying to evaporate the alcohol solvent. The tricresyl phosphate acts as a plasticizer or elasticizer to produce a soft, flexible, stretchy film. Other polyvinyl aldehyde polymer resins can be used in place of the polyvinyl butyral. These are all commonly referred to as "polyvinyl acetals."

The bead bonding layer 12 of Fig. 2 was then prepared by knife-coating over the aforesaid backing film (while attached to the carrier web) a solution of the following composition:

| | |
|---|---|
| Blown castor oil | 100 |
| "Beetle 227–8" (50% solids) | 200 |

The "Beetle 227–8" is a 50% solution of thermosetting urea-formaldehyde resin in a solvent composed of 60 parts butyl alcohol and 40 parts xylol, sold by American Cyanamid Co.

This bonding composition provides a flexible and stretchy bonding layer which is weatherproof and non-darkening, provides a good bond to glass beads, and integrally bonds to the underlying polyvinyl butyral film. The wet weight of the applied coating was about 10-11 grains per 24 sq. in., adapted to form a dried layer which will firmly hold the glass beads, rising on the sides of the beads somewhat above the centers to provide sockets.

With the bonding coat still in a wet or undried state, small transparent glass beads graded to have diameters largely in the range of 5 to 7 mils (No. 11 size), having a refractive index of about 1.53, were applied in excess to form a surface layer, sinking down in the wet bonding coat until they touched, or closely approached, the surface of the underlying backing film. The web was then passed down around a roller to cause excess beads to fall off. The weight of the bead layer coat was about 45 grains per 24 sq. in.

The web, with its applied coatings, was then festooned on racks and oven cured, to set up the bead bonding composition, by subjection to a heat of 140° F. for 30 minutes, 175° F. for 30 minutes, and then 225° F. for 80 minutes.

After cooling, the web was drawn around a roller with a parallel knife blade spaced just far enough away to catch and remove any remaining surplus beads adhering to the surface above the normal bead layer. A rotary brush and air blast can be used to accomplish this result. The carrier web was then stripped away and the beaded sheeting wound in a roll, ready for application of the pressure-sensitive adhesive on the back face.

A roll of regenerated cellulose film (Cellophane) of requisite width was used as a carrier web support for casting the pressure-sensitive adhesive, which is described hereafter as "Adhesive example." The latter, dissolved in a volatile vehicle was knife coated on the Cellophane web in amount sufficient to provide a dried thickness of approximately 1.0 mil, an uncoated margin being provided at each edge. The web was then sent through an oven to evaporate the solvent.

The beaded sheeting and the adhesive coated Cellophane were then laminated together by being passed through the nip of a pair of driven squeeze rolls, the exposed tacky surface of the adhesive layer contacting and adhering to the film backing, and the Cellophane remaining as a support and liner, covering the adhesive layer.

The advantage of this procedure for applying the pressure-sensitive adhesive, is that stretching of the stretchy beaded sheet (which is quite stretchy) is avoided. Also, solvents for the adhesive can be used which, if the adhesive solution were applied directly to the backing film, might soften or weaken it, since by the present method the adhesive solvent has been removed before the adhesive contacts the backing film.

Although the Cellophane liner can be left in place, to be removed by the user of the product, this is not necessary. When the beaded sheeting is slit for winding into rolls the Cellophane liner can be removed just before the slitting operation. Wetting or moistening the Cellophane will cause it to lose its adherence to the pressure-sensitive adhesive surface in contact therewith so that it can be readily stripped off.

The resultant finished rolls will then be as shown in Fig. 1, the tape or sheeting having the structure shown in Fig. 2. In this case the total spacing distance (combined thickness of layers 11 and 14) was approximately 2.2 mils (about 35% of the average bead diameter), and the total sheet thickness did not exceed 10 mils. The tape or sheet was quite transparent, in the sense that when placed in contact with a printed page, the printing could easily be read through it. It had a tensile strength of about ½ pound per inch width and could easily be stretched to double its length (i. e. a stretch of at least 100%). The highly waterproof nature was demonstrated by immersing in water over-night, which did not cause the sheet to come apart.

When applied to the surface of an enamelled metal highway sign, and subjected to outdoor exposure, the pressure-sensitive adhesive gradually firmed up and hardened so that the sheet could not be pulled off. This takes only a few days in summer, and even in Northern winter climates takes only 1-2 weeks. The hardening results primarily from the action of the sun's rays, which penetrate to and through the adhesive, and is due mostly to the action of ultraviolet rays rather than to heating. If desired, the adhesive can be hardened in the shop by exposing the sign to rays from an ultra-violet lamp, using intense rays to hasten the process. The adhesive does not darken and, if anything, tends to bleach out, when subjected to solar rays. In contrast, conventional transparent rubber-resin pressure-sensitive adhesives darken and soften when subjected to prolonged exposure to the sun.

Instead of using inorganic glass beads, use may be made of beads of "organic glass," such as those made of methyl methacrylate.

The following example illustrates solar-hardening non-darkening transparent pressure-sensitive adhesives, dispersed in volatile solvent vehicles, ready for application as previously mentioned.

ADHESIVE EXAMPLE

A.—Alkyd resin base

|  | Pounds |
|---|---|
| Castor oil (No. 3 grade) | 350 |
| Citric acid monohydrate | 70 |
| "Amsco-Solv A" | 850 |

In a corrosion-resistant direct-fired kettle fitted with a mechanical stirrer, the castor oil was heated to 350° F. The citric acid was then added in small portions as rapidly as possible consistent with foaming, the temperature being maintained meanwhile at 350° F. The temperature was then raised to 380–385° F. and maintained until the viscosity of the resin had increased to approximately 200 centipoises measured at 302° F.; the batch was then allowed to cool, reaching a temperature of approximately 365° F. and a viscosity of 800 cps. (measured at 302° F.) at the same time.

400 lbs. of this viscous liquid were transferred to a heavy duty internal mixer (such as a Baker-Perkins "Mogul" mixer) and heating and mixing were continued. With the resin at 285–290° F., there was required a total of 2 hrs. 20 minutes. At this point the resin had firmed up and was starting to become crumbly, or to break apart into separate lumps. Cold water was then run into the jacket of the mixer; and cooling and mixing were continued for two hours, the resin meanwhile working together again into a tough, sticky, rubbery mass.

To this mass was then added "Amsco-Solv A," a hydrocarbon solvent of 50% aromatic content as sold by American Mineral Spirits Company of Chicago, Illinois. The solvent was added slowly to form a smooth solution or dispersion analyzing 32.6% resin.

B.—Firming agent

| | Pounds |
|---|---|
| "Butvar" powder, (a polyvinyl butyral in dry powdered form produced by Monsanto Chemical Company of St. Louis, Mo.) | 25 |
| Tertiary butyl alcohol | 225 |

The "Butvar" was added slowly to the alcohol with agitation, and stirred until dissolved to a smooth solution.

C.—Adhesive product

| | Pounds |
|---|---|
| Alkyd resin solution of "A" | 115 |
| "Butvar" solution of "B" | 30 |
| "Amsco-Solv A" | 40 |

This adhesive product contains 100 alkyd resin to 8 "Butvar," in parts by weight on a dry basis.

The alkyd resin and "Butvar" solutions were mixed in a churn, and the "Amsco-Solv A" was then added and mixed in to produce a proper viscosity solution for coating.

Coatings formed of the foregoing, after solvent evaporation, are normally tacky and pressure-sensitive, and stretchy, and are quite stable under room conditions, especially when tape coated therewith is wound in roll form. The adhesive coatings, while tacky, are "eucohesive," by which it is meant that they are more cohesive than adhesive such that offsetting or transfer of adhesive material does not result when tape coated therewith is unwound from rolls or removed from surfaces to which temporarily applied, and can be handled without transfer of adhesive material to the fingers. Hence they are to be distinguished from merely "sticky" materials. When exposed outdoors, as when applied to a sign, they harden up as previously described, but without becoming dark or losing transparency.

Having described various embodiments of my invention, for purposes of illustration rather than limitation, what I claim is as follows:

1. A flexible transparent adhesive tape or sheet which is weatherproof and stretchy to the extent of at least 25%, adapted for use in surfacing outdoor signs to produce reflex reflection of incident light, comprising a transparent flexible stretchy film backing, a transparent non-darkening and solar-hardening stretchy pressure-sensitive adhesive coating on one side thereof and on the other side a transparent flexible and stretchy bonding layer, and a layer of small transparent glass beads partially embedded in the bonding layer to provide a surface of contiguous convex lens elements, the total thickness of the tape or sheet not exceeding the order of 10 mils.

2. In combination with a base having a reflective surface, an overlying preformed transparent adhesive tape or sheet having a tacky and pressure-sensitive inner face in adhesive contact with said reflective surface and having a lenticular outer surface formed of a multiplicity of contiguous small convex lens elements, said adhesive tape or sheet being adapted to produce reflex reflection of incident light from the underlying reflective surface of said base.

3. In a sign adapted for outdoor use involving exposure to solar rays and weathering conditions, having a base provided with a reflective surface forming a design or indicia, the combination of an overlying preformed transparent adhesive tape or sheet which is weatherproof and non-darkening and comprised of a transparent flexible film backing, a transparent pressure-sensitive adhesive coating on the under side thereof in adhesive contact with the underlying sign surface, a transparent flexible weatherproof bead-bonding coat united to the outer side of said film backing and a layer of small transparent glass beads partially embedded therein, substantially reaching the backing film, said tape or sheet causing reflex reflection of incident light rays striking the underlying reflective surface and being sufficiently transparent so as to reveal the sign design or indicia under day viewing conditions.

4. An article according to claim 3 wherein the transparent pressure-sensitive adhesive is solar-hardening.

5. In combination with a preformed sign having embossed indicia, such as a highway or traffic sign of the character described, a preformed flexible transparent weather-resistant adhesive sheet which is stretchy to the extent of at least 25% and covers the face of the sign, being stretched to conform to the surface thereof, the inner face of the transparent sheet being tacky and in adhesive contact with the face of the sign and the outer face formed of a multiplicity of contiguous small convex lens elements, said transparent sheet not substantially interfering with the sign appearance when viewed by day and providing a reflex reflection characteristic for night viewing by persons located near the axis of an incident beam of light.

6. A flexible transparent optical adhesive sheet which is weatherproof and adapted for use in surfacing outdoor signs to produce reflex reflection of incident light, comprising a flexible film structure the front face of which has a lenticular surface formed of a multiplicity of contiguous small convex lens elements and the back face of which is formed of a layer of waterproof solar-hardening and non-darkening transparent pressure-sensitive adhesive adapted to bond the sheet to surfaces by mere application of pressure and to subsequently harden when exposed to solar rays to increase the strength of the bond but without darkening; said sheet being stretchy to the extent of at least 25% and the lenticular front face being formed of a layer of transparent spheres having an average diameter not exceeding about 10 mils.

PHILIP V. PALMQUIST.

REFERENCES CITED

The following references are of record in the file of this patent:

UNITED STATES PATENTS

| Number | Name | Date |
|---|---|---|
| 823,445 | Schramm | June 12, 1906 |
| 1,176,746 | Federico | Mar. 28, 1916 |
| 1,510,049 | Fair | Sept. 30, 1924 |
| 1,873,261 | Barclay | Aug. 23, 1932 |
| 1,902,440 | Gill | Mar. 21, 1933 |
| 1,966,141 | Reis-Schmidt | July 10, 1934 |
| 2,094,428 | Fulton | Sept. 28, 1937 |
| 2,143,946 | Hunter | Jan. 17, 1939 |
| 2,177,627 | Drew | Oct. 31, 1939 |
| 2,216,289 | Asnes | Oct. 1, 1940 |
| 2,251,386 | White | Aug. 5, 1941 |
| 2,294,930 | Palmquist | Sept. 8, 1942 |